United States Patent [19]
O'Hagan et al.

[11] Patent Number: 5,763,864
[45] Date of Patent: Jun. 9, 1998

[54] DATAFORM READER INCLUDING DUAL LASER AND IMAGING READING ASSEMBLIES

[75] Inventors: Timothy P. O'Hagan, Akron, Ohio; Ynjiun P. Wang, Fort Myers, Fla.; Daniel G. Wall, Uniontown, Ohio

[73] Assignee: Meta Holding Corporation, Fort Myers, Fla.

[21] Appl. No.: 550,911

[22] Filed: Oct. 23, 1995

Related U.S. Application Data

[63] Continuation-in-part of Ser. No. 544,618, Oct. 18, 1995, Ser. No. 332,592, Oct. 31, 1994, Pat. No. 5,521,366, and Ser. No. 280,489, Jul. 26, 1994, Pat. No. 5,572,006.

[51] Int. Cl.$^6$ .................................................... G06K 7/10
[52] U.S. Cl. ........................................ 235/472; 235/462
[58] Field of Search ................................ 235/462, 472, 235/454, 467, 469, 463

[56] References Cited

U.S. PATENT DOCUMENTS

| | | |
|---|---|---|
| 4,210,802 | 7/1980 | Sakai . |
| 4,409,470 | 10/1983 | Shepard et al. . |
| 4,734,566 | 3/1988 | Senda et al. . |
| 4,766,300 | 8/1988 | Chadima, Jr. et al. . |
| 4,835,615 | 5/1989 | Taniguchi et al. . |
| 4,877,949 | 10/1989 | Danielson et al. . |
| 4,952,966 | 8/1990 | Ishida et al. . |
| 4,962,432 | 10/1990 | Ohtsuka et al. . |
| 4,996,413 | 2/1991 | McDaniel et al. . |
| 5,010,580 | 4/1991 | Vincent et al. . |
| 5,019,699 | 5/1991 | Koenck . |
| 5,025,319 | 6/1991 | Mutoh et al. . |
| 5,080,456 | 1/1992 | Katz et al. . |
| 5,083,150 | 1/1992 | Nagasaki et al. . |
| 5,128,769 | 7/1992 | Aria et al. . |
| 5,130,520 | 7/1992 | Shepard et al. . |
| 5,131,053 | 7/1992 | Bernzott et al. . |
| 5,168,149 | 12/1992 | Dvorkis et al. . |
| 5,184,005 | 2/1993 | Ukai et al. . |
| 5,187,356 | 2/1993 | Chadima, Jr. et al. . |
| 5,200,597 | 4/1993 | Eastman et al. . |

(List continued on next page.)

FOREIGN PATENT DOCUMENTS

| | | | |
|---|---|---|---|
| 60-129891 | 7/1985 | Japan . | |
| 63-67692 | 3/1988 | Japan . | |
| 63-83886 | 4/1988 | Japan . | |
| 0264383 | 10/1990 | Japan | 235/462 |
| 0198175 | 8/1991 | Japan | 235/462 |
| 5-242287 | 9/1993 | Japan . | |
| 6162247 | 6/1994 | Japan | 235/472 |

OTHER PUBLICATIONS

PCT International Search Report dated Sep. 18, 1996 (two pages).
PCT International Search Report date Nov. 7, 1996 (one page).

*Primary Examiner*—Harold Pitts
*Assistant Examiner*—Thien Minh Le

[57] ABSTRACT

A hand held dataform reader for reading 1D and 2D bar codes and matrix dataforms is disclosed. The dataform reader includes a dataform reader module having a laser bar code dataform reading assembly, for reading 1D bar codes, and an imaging dataform reading assembly, for reading 2D bar codes and matrix codes. The dataform reader module further includes selection and control circuitry for energizing a selected one of the reading assemblies. In operation, the laser reading assembly is energized first. If the target dataform is a 1D bar code, a decodable signal will be generated and decoding circuitry will decode the target dataform. If a decodable signal is not generated by the laser reading assembly, the selection and control circuitry turns off the laser reading assembly and energizes the imaging dataform reading assembly. If the target dataform is a 2D bar code or matrix dataform, the imaging dataform reading assembly will generate a decodable composite video signal representing the image of the dataform. If the video signal is decodable, the decoding circuitry will decode the target dataform.

13 Claims, 7 Drawing Sheets

U.S. PATENT DOCUMENTS

| | | |
|---|---|---|
| 5,210,398 | 5/1993 | Metlitsky . |
| 5,235,167 | 8/1993 | Dvorkis et al. . |
| 5,237,365 | 8/1993 | Miyazawa . |
| 5,243,666 | 9/1993 | Hasfeave et al. . |
| 5,245,445 | 9/1993 | Fujisawa et al. . |
| 5,258,604 | 11/1993 | Behrens et al. . |
| 5,262,871 | 11/1993 | Wilder et al. . |
| 5,272,538 | 12/1993 | Homma et al. . |
| 5,276,315 | 1/1994 | Surka . |
| 5,278,397 | 1/1994 | Barken et al. ............... 235/472 X |
| 5,291,009 | 3/1994 | Roustaei . |
| 5,293,238 | 3/1994 | Nakano et al. . |
| 5,296,690 | 3/1994 | Chandler et al. . |
| 5,308,960 | 5/1994 | Smith et al. . |
| 5,308,966 | 5/1994 | Danielson . |
| 5,309,243 | 5/1994 | Tsai . |
| 5,314,631 | 5/1994 | Katoh et al. . |
| 5,315,095 | 5/1994 | Maron et al. . |
| 5,319,181 | 6/1994 | Shellhammer et al. . |
| 5,331,143 | 7/1994 | Maron et al. . |
| 5,332,892 | 7/1994 | Li et al. . |
| 5,340,973 | 8/1994 | Knowles et al. . |
| 5,345,266 | 9/1994 | Denyer . |
| 5,349,172 | 9/1994 | Roustaei . |
| 5,352,884 | 10/1994 | Petrick et al. . |
| 5,354,977 | 10/1994 | Roustaei . |
| 5,359,185 | 10/1994 | Hason . |
| 5,386,271 | 1/1995 | Maekawa et al. . |
| 5,401,949 | 3/1995 | Ziemacki et al. . |
| 5,406,063 | 4/1995 | Jelen . |
| 5,408,084 | 4/1995 | Brandorff et al. . |
| 5,414,251 | 5/1995 | Durbin . |
| 5,418,357 | 5/1995 | Inoue et al. . |
| 5,420,635 | 5/1995 | Konishi et al. . |
| 5,420,943 | 5/1995 | Mak . |
| 5,448,293 | 9/1995 | Kogane et al. . |
| 5,468,947 | 11/1995 | Danielson et al. . |
| 5,468,950 | 11/1995 | Hanson . |
| 5,478,997 | 12/1995 | Bridgeall et al. . |
| 5,484,994 | 1/1996 | Roustaei . |
| 5,486,688 | 1/1996 | Iima et al. ............... 235/462 |
| 5,496,992 | 3/1996 | Madan et al. . |
| 5,504,316 | 4/1996 | Bridgall et al. . |
| 5,559,555 | 9/1996 | Shimzu et al. . |

DATAFORM READER INCLUDING DUAL LASER AND IMAGING READING ASSEMBLIES

CROSS REFERENCE TO RELATED APPLICATIONS

This application is a continuation-in-part of copending application Ser. No. 08/544,618, filed Oct. 18, 1995, entitled "Extended Working Range Dataform Reader Including Fuzzy Logic Image Control Circuitry" and a C.I.P. application Ser. No. 08/332,592, filed Oct. 31, 1994, now U.S. Pat. No. 5,521,366 entitled "Dataform Readers and Methods" and a CIP application Ser. No. 08/280,489, filed Jul. 26, 1994, now U.S. Pat. No. 5,572,006 entitled "Automatic Exposure Single Frame Imaging Systems". Each of the aforesaid applications is incorporated herein in its respective entirety by reference.

FIELD OF THE INVENTION

The present invention relates to a dataform reader and method for reading dataforms including bar codes and matrix codes and, more particularly, to a dataform reader including a laser bar code dataform reading assembly for reading one dimensional bar code dataforms and a high resolution imaging dataform reading assembly for reading two dimensional bar code and matrix code dataforms.

BACKGROUND OF DATAFORM READER

Present portable data collection terminals having integrated laser bar code dataform scanners or one dimensional (1D) charge coupled device (CCD) bar code readers are not well suited for reading two dimensional (2D) bar code dataforms. Laser bar code scanners are non-imaging systems in that they operate by projecting a narrow laser beam of light which forms an intensely illuminated spot on a bar code dataform in a target area and one or more photodetectors collect the reflected illumination from the entire bar code. Oscillating mirrors continually redirect the laser beam so that the spot moves in a sweeping or a raster pattern. Generally a sweeping pattern refers to oscillation of the beam along the horizontal axis without any vertical oscillation. A raster pattern refers to a rapid oscillation along the horizontal axis and a slower oscillation along the vertical axis so that raster pattern appears to be a sweeping pattern moving up and down. A photodetector collects illumination from the entire target area. When the moving or flying spot is incident on a highly reflective portion of the target bar code, such as a white background, light reflected from the spot is incident on the photosensor. When the flying spot is incident on a less reflective portion of the bar code, such as a black bar, less light is reflected towards the photodetector or photodetectors.

A laser scanner does not have an internal synchronization mechanism. The laser scanner calculates the laser spot's relative horizontal position based on known self-synchronizing patterns in the 1D bar code. This can be referred to as a code self-synchronized system. A raster pattern laser scanner can read a 2D stacked bar code such as PDF-417 because PDF-417 has particular row indicator patterns which are recognizable and used by the scanner for vertical synchronization. A typical laser scanner has very little rotation angle tolerance, because the scanner can not recognize a row indicator pattern or other code word pattern unless the spot sweeps across the entire pattern.

The advantage of a laser scanner is that it can read a 1D bar code which is as wide as the beam sweep. However, a laser scanner can not read 2D matrix codes such as the Maxicode and the Datamatrix because such codes do not have row indicator patterns for vertical synchronization.

In addition to laser scanners, there are 1D charge coupled device (CCD) bar code readers. CCD readers are imaging based systems in that the CCD reader operates by imaging a long and thin target area onto a one dimensional photodetector array rather than scanning a spot of illumination across the bar code symbol. If the CCD reader is positioned relative to a target 1D bar code so that the imaged target area falls relatively evenly across the bar code, the bar code can be decoded based on the run-length sequences of gray scale values derived from the photosensors or pixels on which each bar and space of the bar code is imaged. The maximum length of 1D code that a CCD reader can read is dependent on the number of photosensors or pixels in the photosensor array. Typically, each bar or space, including the smallest bar or space, must be imaged onto at least two pixels. Therefore, a linear photosensor array with 2056 pixels can be used to read a code up to 1028 modules wide. Similar to the laser scanner, the 1D CCD reader does not have vertical synchronization capability and must rely on row indicator patterns for vertical synchronization.

A two dimensional (2D) CCD contact reader has been marketed by Tokyo Electric Company. A two dimensional CCD reader images an area onto a two dimensional array of photodetectors. Such a device is capable of reading matrix codes because the two dimensional photodetector or pixel array provides both horizontal and vertical synchronization.

The problem associated with two dimensional CCD readers is that the array is typically only 756 pixels wide. This pixel count limits the maximum width of 1D codes that can be read. Therefore, there is a need to have a non-contact 2D imaging based dataform reader which is capable of reading 2D stacked bar codes and matrix codes. Furthermore, the reader should have a non-imaging based system for reading wide 1D bar codes.

SUMMARY OF THE INVENTION

In accordance with this invention, a portable dataform reader module is provided that includes a non-imaging laser bar code dataform reading assembly for reading 1D bar code dataforms and an imaging dataform reading assembly for reading 2D bar code and matrix code dataforms.

In a first embodiment of the reader module, the imaging dataform reading assembly includes a camera assembly including a two dimensional photosensor array positioned to view a dataform positioned in a target area. An optic element is positioned to the front of the photosensor array for focusing an image of the target dataform onto the photosensor array. A housing supports the optic element and shrouds ambient illumination from the photosensor array. The camera assembly is secured to a base printed circuit board of the dataform reader. Further, the camera assembly may include an array of LED illuminators for uniformly illuminating the target area.

The laser dataform reading assembly includes a laser positioned adjacent to the camera assembly which, when energized, projects a laser beam toward the target dataform. The laser is secured to a platform which is mounted to the base member with four flexures which enable the platform and laser to rock in an oscillating motion. An electromagnetic assembly is employed to drive the laser in an oscillating motion causing the projected laser beam to sweep across the target area. A photodetector is secured to the oscillating platform for detecting the varying intensity of the reflected laser illumination.

In operation, a dataform reading session commences with energization of the laser dataform reading assembly to detect the high contrast transitions of a dataform and decode 1D dataforms if present. If high contrast transitions are present, but a 1D dataform is not decodable, then the laser reading assembly is shut down and an image of the target area is captured by the camera assembly for decoding.

In a second embodiment of the reader module of the present invention, the laser dataform reading assembly includes a fixed mounted laser source and an oscillating mirror for sweeping the beam across a dataform in a target area. One or more photodetectors are positioned to receive reflected illumination from the entire target area or positioned to receive reflected illumination from the oscillating mirror (retro-reflective).

In a third embodiment of the reader module of the present invention, the laser dataform reading assembly does not include a photodetector. Instead, the two dimensional photosensor array associated with the imaging dataform reading assembly is used to detect the varying intensity of reflected laser illumination. A housing of the camera assembly includes a member which is pivotable between two positions. In a first position, the member permits the photosensor array to receive an image of the target area thereby permitting dataform reading utilizing the imaging dataform reading assembly. In a second position, the member permits the photosensor array to receive reflected illumination from the target area resulting from the laser beam oscillating across the target dataform.

The photosensor array preferably comprises an array of photodiodes and read out circuitry such that each photodiode can be read out independently and in a random order, or groups of photodiodes can be read out simultaneously, thereby generating a signal representative of the average illumination on the photosensor array.

The aforementioned and other aspects of the present invention are describe in more detail in the detailed description and accompanying drawings which follow.

DETAILED DESCRIPTION

Figure 1:
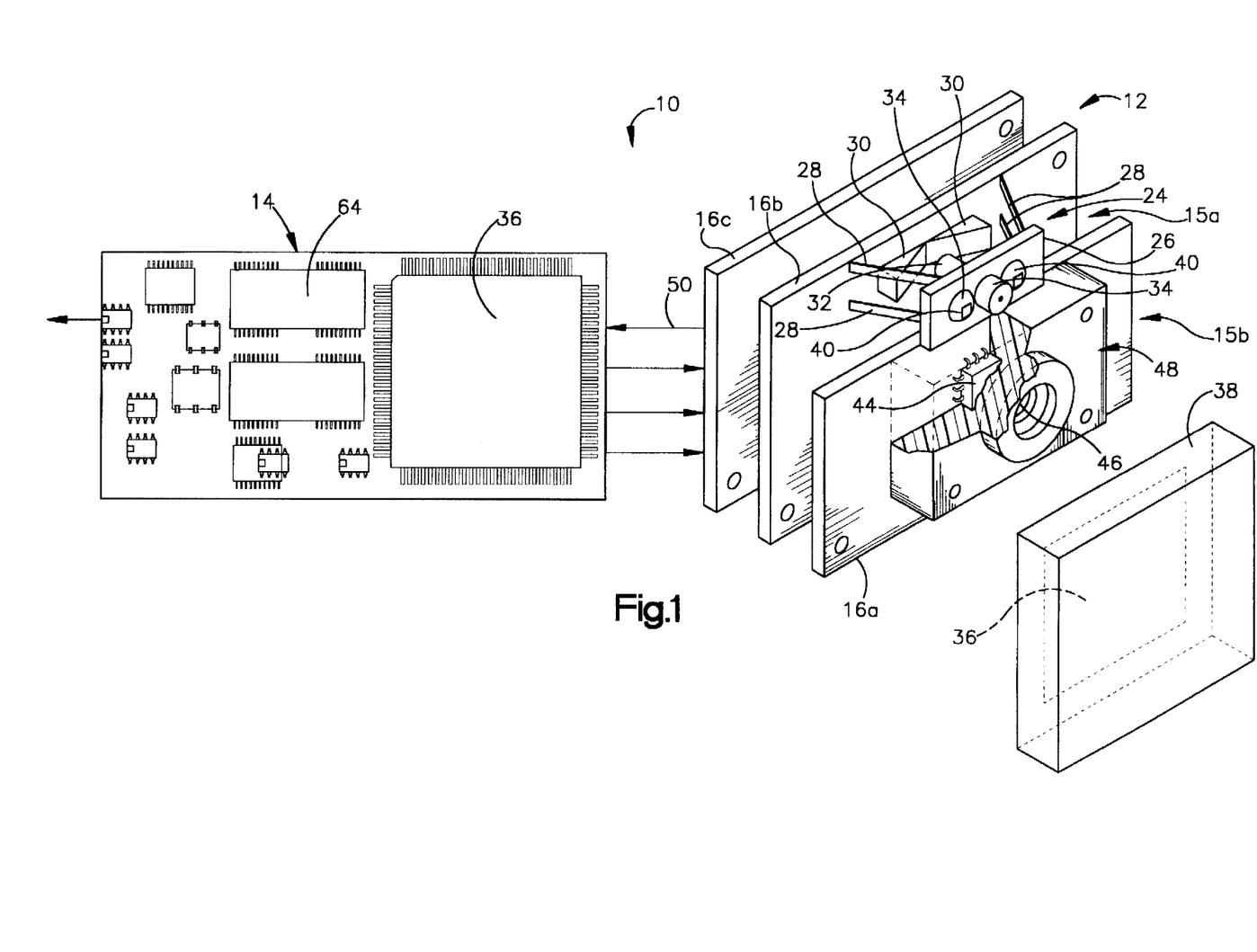
FIG. 1 is a perspective view of a dataform reader module of the present invention.

A dataform reader module in accordance with the present invention is shown generally as 10 in FIG. 1. The reader module includes an dataform capture assembly 12 and a control and decoder board 14.

The dataform capture assembly 12 includes a laser bar code dataform reading assembly 15a for reading one dimensional (1D) bar code dataforms and an imaging dataform reading assembly 15b for reading two dimensional (2D) bar codes and matrix codes. The dataform capture assembly 12 is disposed on three spaced apart printed circuit boards 16a, 16b and 16c (corresponding to first, second and third printed circuit boards). The laser reading assembly 15a includes an oscillating laser assembly 24 secured to the second printed circuit board 16b. The second printed circuit board 16b is larger than the first printed circuit board 16a and spaced apart from the first circuit board so that operation of the laser bar code reading assembly 15a does not interfere with operation of the circuitry on the first printed circuit board 14a.

The oscillating laser assembly 24 includes an oscillating platform 26 which is secured to the second printed circuit board 16b with four flexures 28. Each flexure 28 is made of a thin flexible material such as MYLAR™. Supported by the flexures 28, the oscillating platform 26 rocks back and forth with respect to the circuit board 16b. The laser reading assembly 15a also includes a pair of electromagnets 30 secured to circuit board 16b. A permanent magnet 32 is secured to the backside of the oscillating platform 26. During a portion of a dataform reading session in which the laser reading assembly 15a is operational, the electromagnets are alternately energized causing the platform 26 to rock back and forth. A laser diode assembly 34 is secured to the oscillating platform 26 and when energized, generates a laser beam directed into a target area to the front of the reader module 10 to read a dataform 36 affixed to an object. A target bar code dataform is shown in dashed lines in FIG. 1.

The laser beam sweeps back and forth across the target dataform 36 as the oscillating platform 26 rocks back and forth. Two unfocused photodetectors 40 are supported on the oscillating platform 26 for collecting reflected illumination from the target area generally in the same direction in which the laser is instantaneously directed while the platform 26 is rocking. Preferably, the photodetectors 40 may be positioned behind holographic illumination collectors 42 which increase the quantity of illumination incident on the photodetectors 40. An oscillating platform laser illumination and collection system in accordance with this invention is described in more detail in U.S. Pat. Nos. 5,115,120 and 5,422,472, both of which are assigned to PSC, Inc. of Webster, N.Y. U.S. Pat. Nos. 5,115,120 and 5,422,472 are incorporated herein in their entireties by reference.

The imaging reading assembly 15b is supported by the first printed circuit board 16a and includes a two-dimensional photosensor array 44 positioned to receive reflected illumination from the dataform 36 in the target area. An optic assembly 46 is positioned between the photosensor array 44 and the target dataform 46 to focus an image of the target dataform on the photosensor array. A camera housing 22 is secured to the first printed circuit board 16a overlying the photosensor array 44. The camera housing 48 supports the optic assembly 46 and shrouds the photosensor array 44 from ambient illumination.

The three printed circuit boards 16a, 16b, and 16c include output signal generating circuitry 50 (FIG. 8) for generating decodable output signal transmitted along a conduction path 51. The decodable output signal is representative of the target dataform in the target area and is decodable by decoding circuitry 52 mounted on the control and decoder board 14 (FIGS. 1 and 8).

Figure 8:
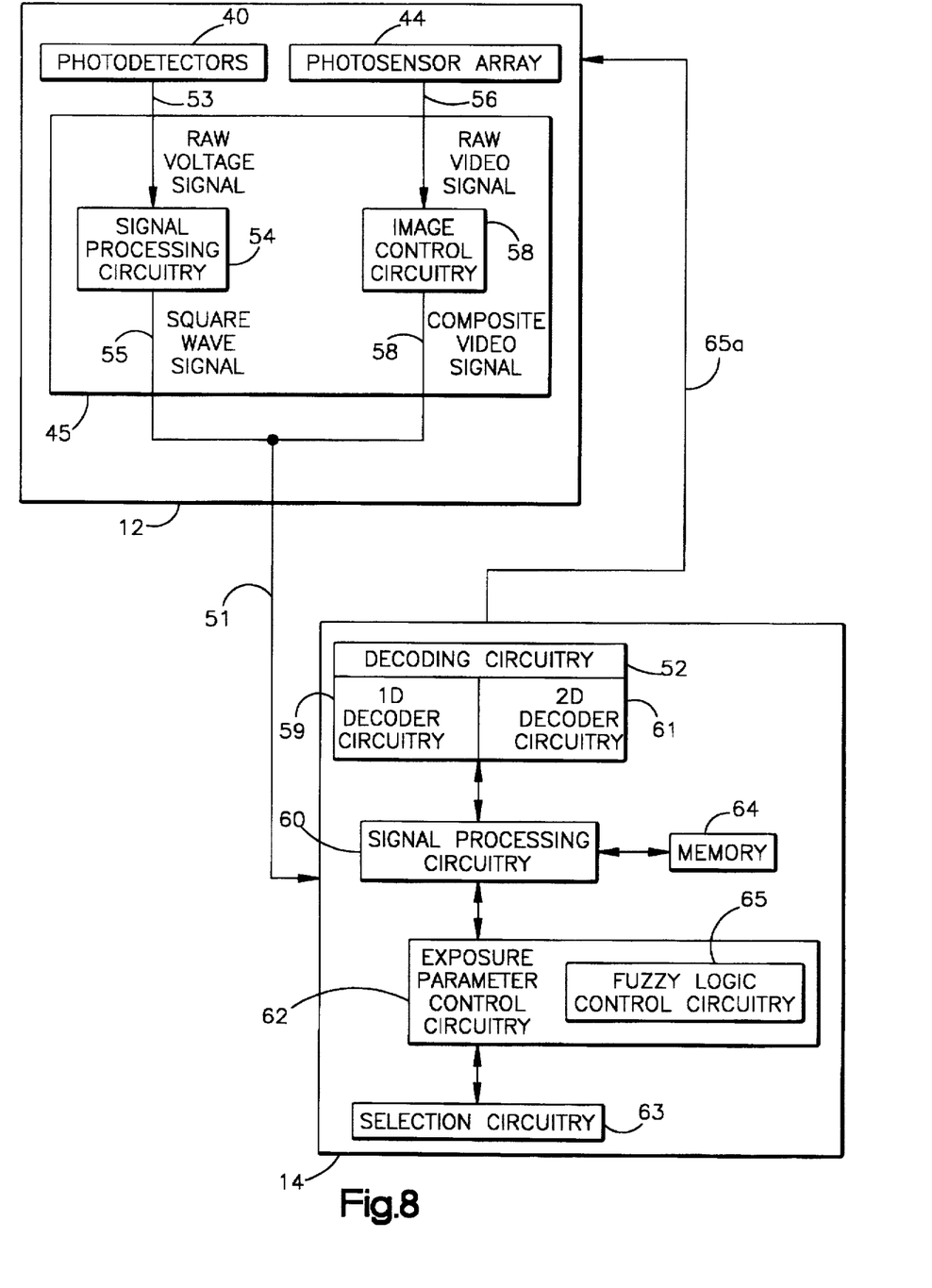
FIG. 8 is a schematic block diagram of selected circuitry of the dataform reader module of FIG. 1.

Referring to FIG. 8, when the laser reading assembly 15a is operational, the photodetectors 40 generate a raw voltage signal 53 wherein the instantaneous voltage magnitude represents the accumulated illumination incident on the photodetectors 40 for a brief exposure period. During the laser beam sweep across the target bar code dataform 36, the quantity of reflected illumination will vary as the laser beam passes across highly reflected spaces and less reflective bands of the dataform. Therefore, the voltage signal from the photodetectors 40 will vary in magnitude exhibiting peaks and troughs which correspond to the varying widths of the bars and spaces of the target bar code dataform 36. Signal processing circuitry 54, well known in the art of laser bar code scanners, is provided to convert the raw voltage signal 53 to an industry standard square wave signal 55 and generates industry standard synchronization signals including the start of scan (SOS) signal indicating when the oscillating laser diode assembly 34 is at its extreme of travel.

The photosensor array 44 is an interlaced charge coupled device (CCD). When operational, the photosensor array 44 generates a raw video signal 56 wherein the instantaneous voltage magnitude during a readout period represents the quantity of illumination accumulated on an individual photosensor element or pixel of the photosensor array 44 during an exposure period. The order in which the pixels are read out is interlaced. The three printed circuit boards 16a, 16b and 16c include image control circuitry 57 for controlling the exposure period for the photosensor array 44, generating clock signals to drive the read out of the photosensor array 44, amplifying the raw video signal and generating industry standard synchronization signals and black level signals necessary to generate an industry standard composite video signal 58.

The square wave signal 55 generated by operation of the laser bar code reading assembly 15a and the composite video signal 58 generated by operation of the imaging bar code dataform reading assembly 15b are transferred to the control and decoder board 14 through the conductor path 51. A single conductor path 50 may be used for transferring both signals 55, 58 because, as will be discussed later, the laser reading assembly 15a and the imaging reading assembly 15b do not operate simultaneously during a dataform reading session.

The control and decoder board 14 includes the decoding circuitry 52 comprising 1D bar code dataform decoder circuitry 59 for decoding the square wave signal 55, signal processing circuitry 60 and 2D decoder circuitry 61 for decoding a dataform represented by the composite video signal 55, exposure parameter control circuitry 62 for determining the appropriate exposure period, gain and reference voltages for operating the imaging reading assembly 15b. The control and decoder board further includes selection circuitry 63 for selecting operation of the laser bar code dataform reading assembly 15a and the imaging dataform reading assembly 15b. Each of these circuits may be embodied in whole or in part in code executed by a microprocessor 62 (FIG. 1).

The signal processing circuitry 60 and 2D decoder circuitry 61 include an analog to digital converter for transforming the composite video signal 58 into a series of gray scale values representative of the quantity illumination incident on each pixel during the exposure period and a memory for storing the gray scale values. The signal processing circuitry 60 also includes circuitry for selectively accessing gray scale values from memory 64 (FIGS. 1 and 8), detecting transition points between dark and light areas of the dataform represented in the memory 64 and decoding the dataform. A more complete description of appropriate signal processing and 2D decoder circuitry can be found in U.S. patent application Ser. No. 08/438,889, filed May 10, 1995, entitled "Oblique Access to Image Data for Reading Dataforms", Ser. No. 08/456,113, filed May 31, 1995, entitled "Maxicode Data Extraction Using Spatial Domain Features", Ser. No. 08/543,122, filed Oct. 13, 1995, entitled "Sub Pixel Dataform Reader With Dynamic Noise Margins", all of which are assigned to the same assignee as the assignee of the present application. Application Ser. Nos. 08/438,889, 08/456,113, and 08/543,122 are all incorporated herein in their entireties by reference.

The exposure parameter control circuitry 62 includes fuzzy logic control circuitry 65 for analyzing the composite video signal 58 and determining an appropriate exposure period and gain setting for operating the imaging based reader system and an appropriate set of reference voltages for operating the analog to digital converter of the signal processing circuitry 60 and the 2D decoder circuitry 61. The control and decoder board 14 outputs control signals 65a to the image capture assembly 12. A more complete description of the fuzzy logic control circuitry 65 is disclosed in patent application Ser. No. 08/544,618, filed Oct. 18, 1995 and entitled "Extended Working Range Dataform Reader Including Fuzzy Logic Image Control Circuitry", which is incorporated in its entirety herein by reference.

Figure 2:
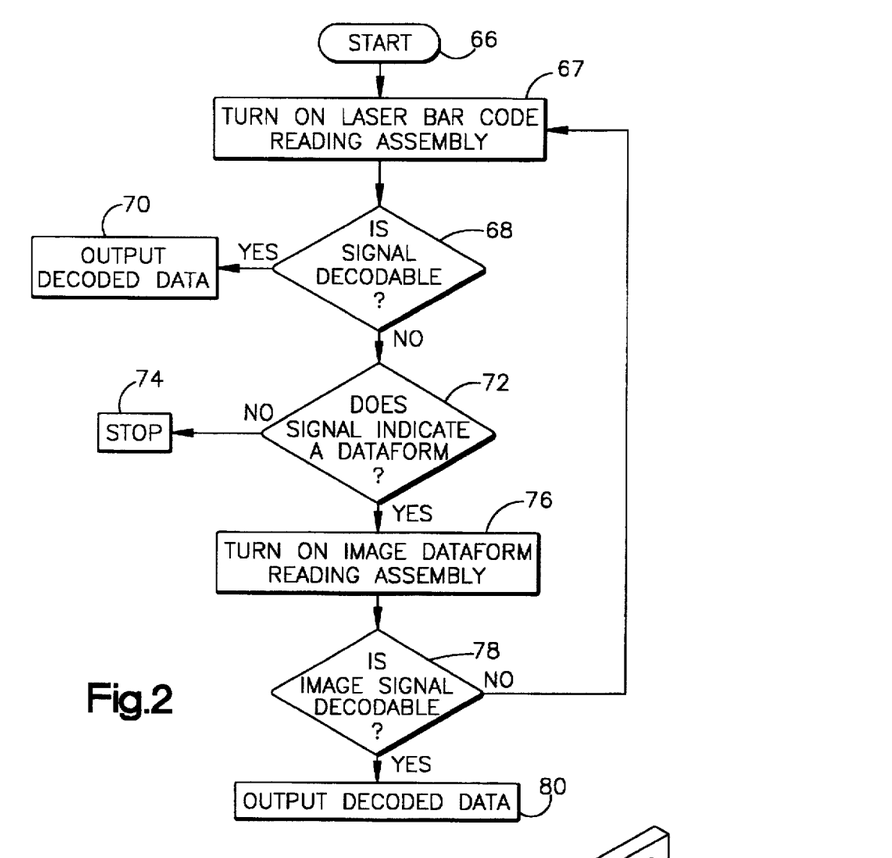
FIG. 2 is a flow chart of operation of the reader module in accordance with this invention.

FIG. 2 is a flow chart illustrating operation of the reader module 10 in accordance with this invention. A dataform reading session is initiated or started at step 66. Starting a reading session causes the laser reading assembly 15a to be energized in an attempt to read a 1D bar code dataform (step 67). The laser reading assembly 15a begins generating the square wave signal 55 representing the time varying laser illumination reflected from the dataform 36 in target area. At step 68, the control and decoder board 14 determines if the square wave signal 55 is decodable. If the square wave signal 55 is determined to decodable, the signal is decoded and the decoded data is output (step 70). If the square wave signal 55 is undecodable, the control and decoder board 14 at step 72 determines whether the square wave signal 55 is consistent with the high contrast transitions between the bars and spaces of a dataform in the target area. If the control and decoder board 14 determines that the square wave signal 55 does not indicate the presence of a dataform, decode session is terminated (step 74).

During the aforementioned operation, the imaging reading assembly 15b is turned of to conserve power. If, the control and decoder board 14 determines that the square wave 55 indicates the presence of a dataform in the target area, albeit an undecodable one, the laser reading assembly 15a is turned off and the image reading assembly 15b is energized to capture of an image of the target area (step 76). At step 78, the control and decoder board 14 attempts to decode the captured image. If decoding is successful, decoded data is output at 80. If unsuccessful, the reader module 10 returns to step 64 wherein the laser reading assembly 15a is again turned on. The purpose of returning to an energized laser reading assembly state is that the intensity of the laser illumination is easy for an operator to see and thus assists the operator in aiming the reading module 10. If after a predetermined period, a dataform is not successfully decoded, the reader module 10 will time out and turn off.

Figure 3:
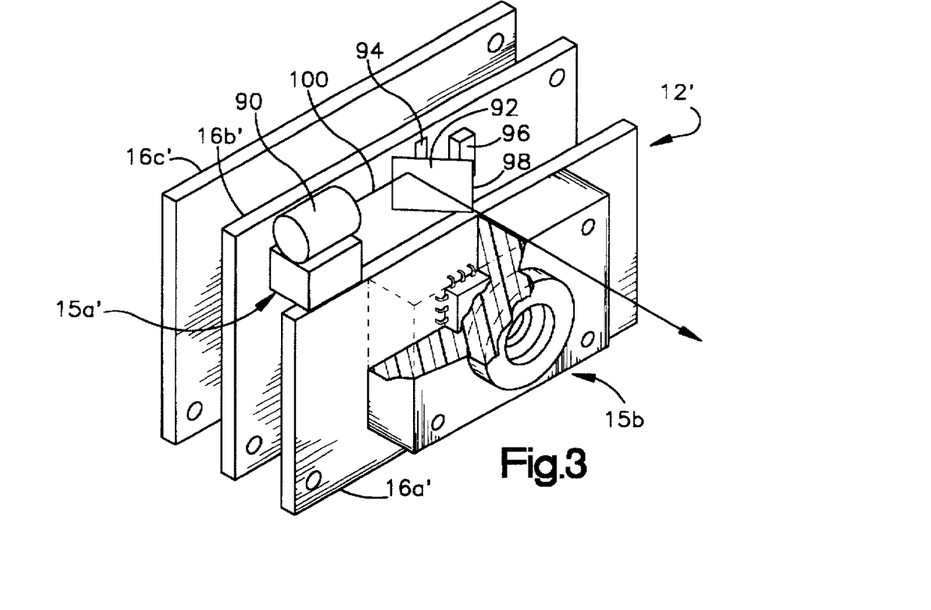
FIG. 3 is a perspective view of an alternative embodiment of a dataform reader module.

FIG. 3 illustrates an alternative embodiment of the reader module 10' of the present invention. While the control and decoder board 14 (not shown) is unchanged from the description in the first embodiment, the image capture assembly is modified. The modified image capture assembly 12' includes a laser bar code dataform reading assembly 15a' which is mounted on a printed circuit board 16b'. The board 16b' is intermediate two circuit boards 16a' and 16c. The imaging dataform reading assembly 15b is mounted on the first board 16a' and is unchanged from the first embodiment. The laser reading assembly 15a' includes a laser 90 secured to the second printed circuit board 16b'. When energized, the laser 90 directs a laser beam along a path 100 generally parallel to the circuit board 16b'. An oscillating mirror 92 is positioned in the laser path 100 and redirects the laser beam towards a dataform (not shown) in a target area. The oscillating mirror 92 is secured to the second printed circuit board 16b' by a MYLAR™ flexure 94 (only a portion of which can be seen in FIG. 3). An electromagnet 96, secured to printed circuit board 16b, co-acts, when energized, with a magnet (not shown) secured to a back of the oscillating mirror 92 causing the mirror to oscillate. A more complete disclosure of such a laser bar code dataform reading assembly 15a' is found in U.S. Pat. No. 5,367,151 assigned to Symbol Technologies Inc., of Bohemia, N.Y. U.S. Pat. No. 5,367,151 is incorporated herein in its entirety by reference. As an alternative to securing each element of the laser reading assembly 15a' to circuit board 16b', an integrated modular laser scan engine such as the Model SE-1000 available from Symbol Technologies of Bohemia, N.Y. may be secured to the circuit board 16a'.

Figure 4A:
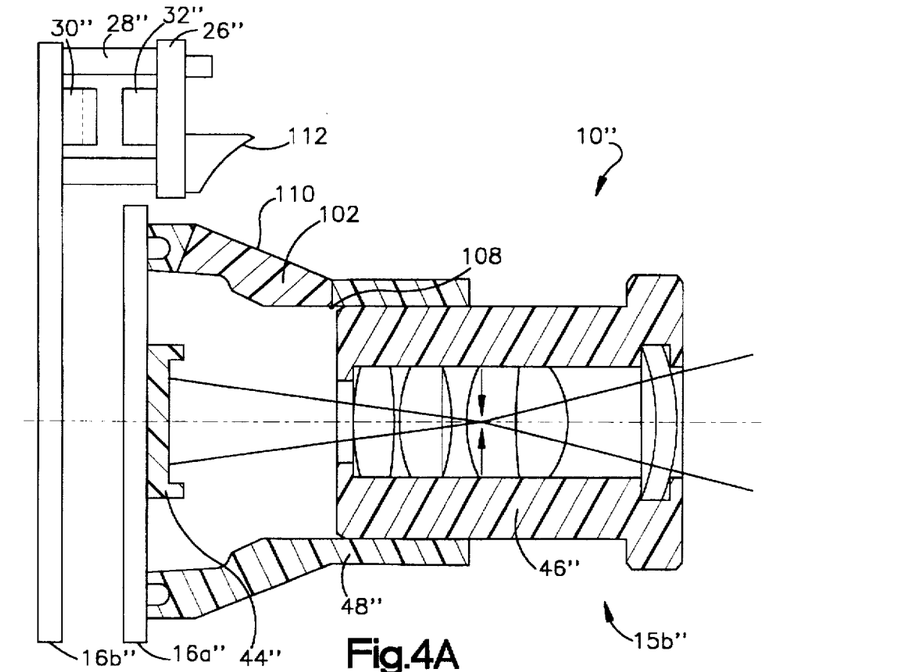
FIG. 4A is the sectional view of another embodiment of the dataform reader module of the present invention having a pivoting member positioned to permit an imaging dataform reading assembly to be utilized to read a target dataform.
Figure 4B:
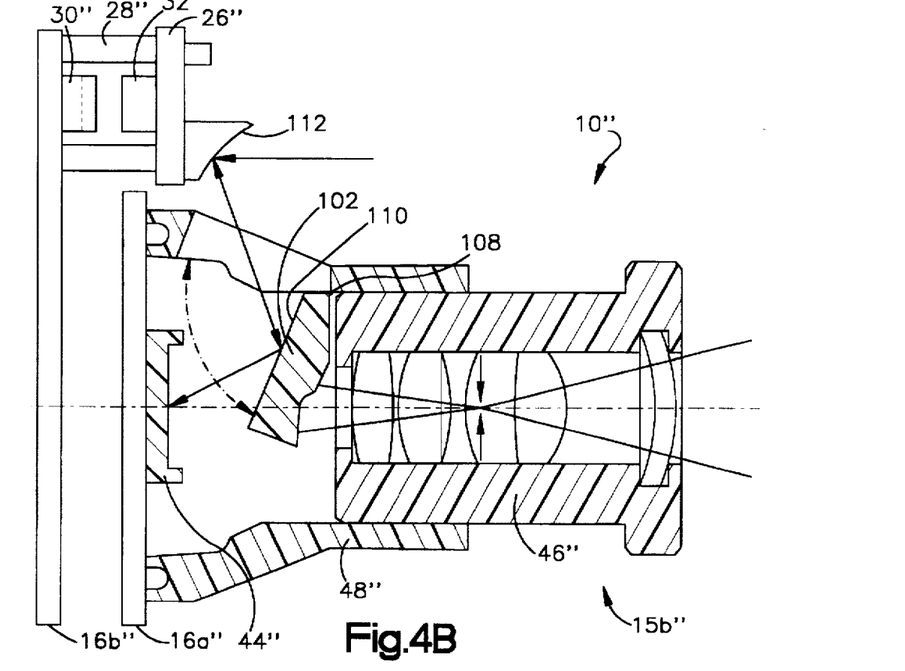
FIG. 4B is a sectional view of the dataform reader module of FIG. 4A in which the pivoting member is positioned to permit a laser dataform reading assembly to be utilized to read a target dataform.

FIGS. 4A and 4B illustrate cross-sectional views of yet another embodiment of the reader module 10" of the present invention. Similar to the first embodiment, an oscillating platform 26" is secured to a second printed circuit board 16b" with four flexures 28". Electromagnets 30" secured to printed circuit board 16b". When energized, the electromagnets 30" co-act with a permanent magnet 32" causing the oscillating platform 26" to rock back and forth. A laser 34" is secured to the oscillating platform 26" and directs a laser beam towards a dataform (not shown) in a target area.

A two-dimensional photosensor array 44" is secured to a printed circuit board 16a" and receives reflected illumination from the target area through an optic assembly 46". A camera housing 48" supports the optic assembly 46" and shrouds ambient illumination from photosensor array 44". The housing 48" includes a door portion 102 which swings about a hinge 108 into a closed position (shown in FIG. 4A) and an open position (shown in FIG. 4B). When in the closed position (FIG. 4A), the door 102 blocks ambient illumination from the photosensor array 44" and only illumination from the target area focused through optic assembly 46" is incident on the photosensor array.

A top surface 110 of the door 102 includes a reflective coating. When the door 102 is in the open position (FIG. 4B), illumination focused through the optic assembly 46" is blocked and only unfocused illumination from the target area is incident onto the photosensor array 18. Illumination from the target area is generally incident on a reflective surface 112 which is secured to the oscillating platform 26". The reflective surface 112 redirects the illumination downward to the reflective surface 110 on the top of the door, which redirects the illumination onto photosensor array 44".

In operation, the door 102 is in the open position (FIG. 4B) when the laser reading assembly 15a" is operating such that the unfocused illumination represents the varying intensity of laser illumination reflected from the bars and spaces of a bar code dataform in the target area as the laser beam traverses across the dataform. The door 102 is in the closed position (FIG. 4A) when the imaging reading assembly 15b" is in operation such that a read out of individual pixels of the photosensor array 44" represents the image of a dataform in the target area.

Figure 5:
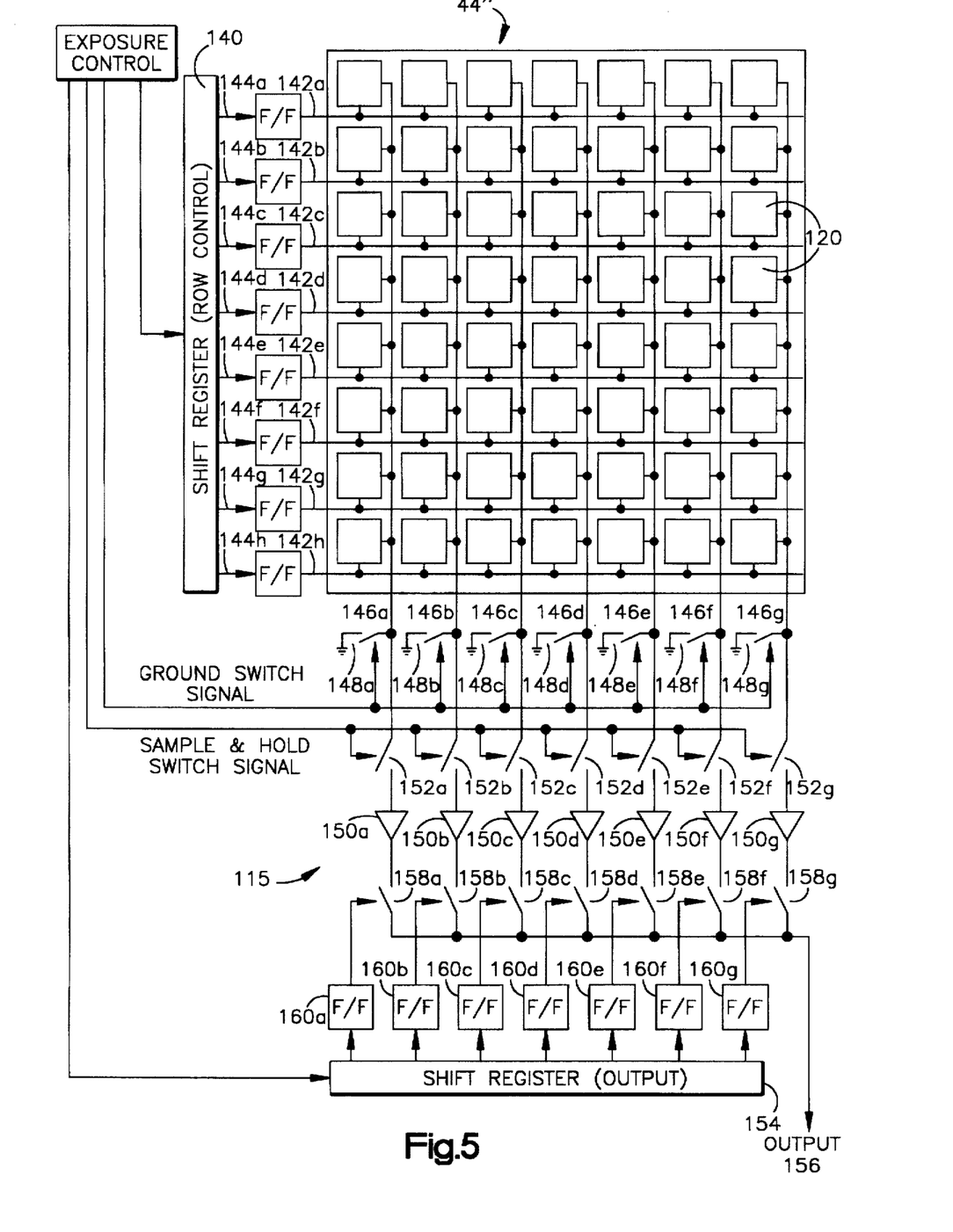
FIG. 5 is a schematic diagram of a photosensor array of the present invention.

Because the reader module 10" utilizes the photosensor array 44" for both the imaging reading assembly 15b" and the laser reading assembly 15a", the photosensor array 44" operates in a selected one of two modes. In one mode all the pixels can be read out simultaneously such that the signal represents average illumination incident on the entire array. In the other mode, the pixels can be read out individually. This mode is used in connection with capturing an image of the target area. FIG. 5 represents a block diagram of read out circuitry 115 associated with the photo sensor array 44" in accordance with this invention.

The photosensor array 44" includes a plurality of sensor elements such as photodiodes 120 arranged in rows and columns. A row control shift register 140 which is coupled to a set of horizontal or row conductors 142a-142h through a corresponding set of flip flops 144a-144h. Each horizontal conductor 142a-142h connects each photodiode 120 in a given row. The photodiodes 120 in a column are connected to a common column conductor 146a-146g. The column conductors 146a-146g can be selectively connected to a reference potential through corresponding ground switches 148a-148g or selectively connected to corresponding sample and hold amplifier 150a-150g through output switch 152a-152g. An output shift register 154 controls connecting of each sample and hold amplifier 150a-150g to a common output port 156 through a series of switches 158a-158g controlled by flip flops 160a-160g.

The row conductors 142a-142h control connection of each photodiode 120 in a particular row to its respective column conductor 146a-146g. The column conductors 146a-146h may be selectively connected to a reference potential to "dump" any accumulated charge on the photodiode so that a controlled exposure period may be started or may be selectively connected to the column's corresponding sample and hold amplifier 150a-150g to read out an accumulated charge after a controlled exposure period. It should be appreciated that each photodiode 120 may be read out individually. Alternately, by simultaneously connecting each photodiode in the array 44" to its respective column conductor 146a-146g and simultaneously connecting each column conductor 146a-146g to its respective sample and hold amplifier 150a-150g and then closing all read out switches 158a-158g simultaneously, the entire array 44" can be read out as if it were a single photodetector. Repetitive read out of all pixels (photodiodes) 120 simultaneously can be used to generate a square wave signal emulating that of a single photodetector typically used with laser scanners (single detector emulation mode).

A more detailed description of such a photosensor array is disclosed in U.S. Pat. No. 5,262,861 which is assigned to Rutgers University. U.S. Pat. No. 5,262,861 is incorporated herein in its entirety by reference.

Figure 6:
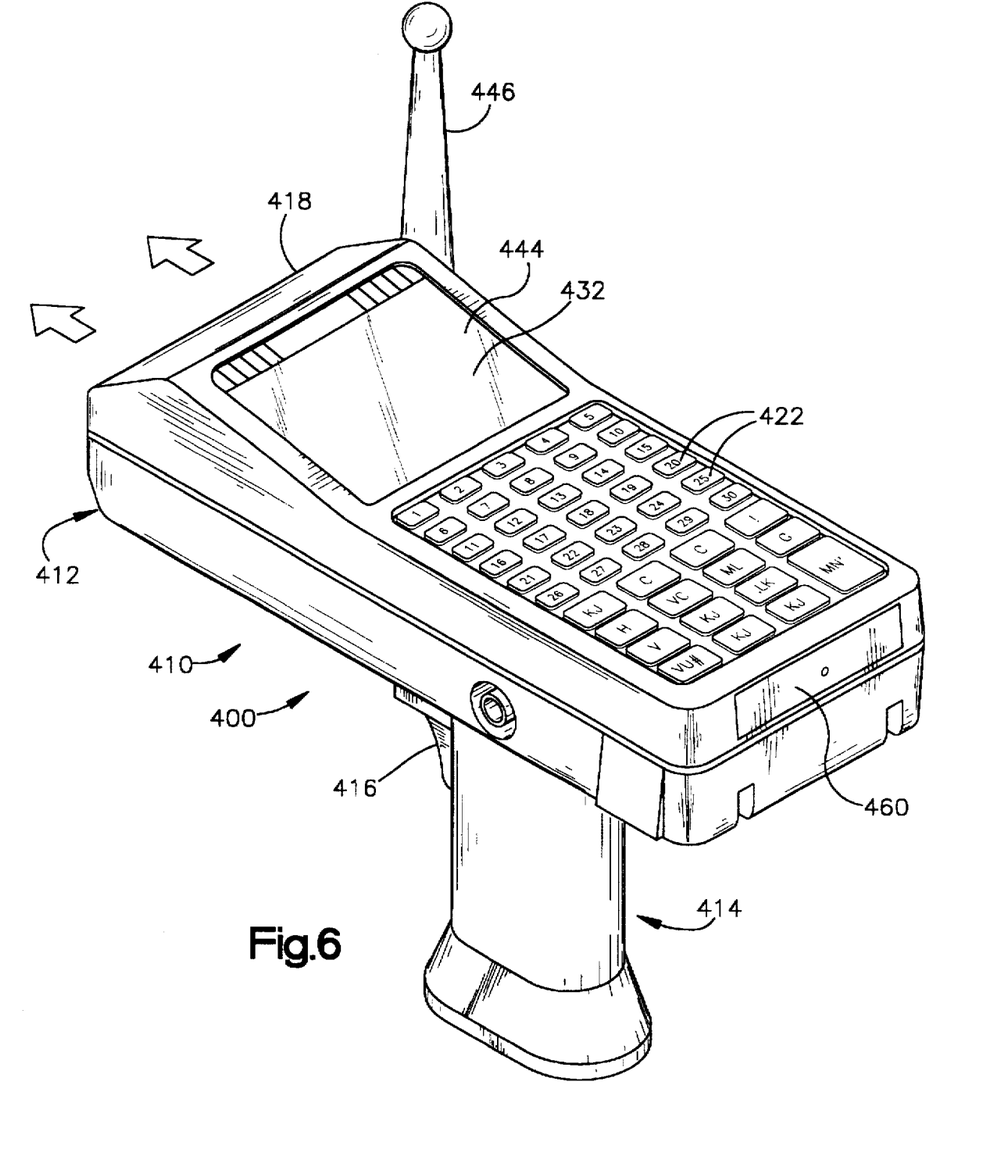
FIG. 6 is a perspective view of a hand held dataform reader of the present invention incorporating the dataform reader module of FIG. 1.
Figure 7:
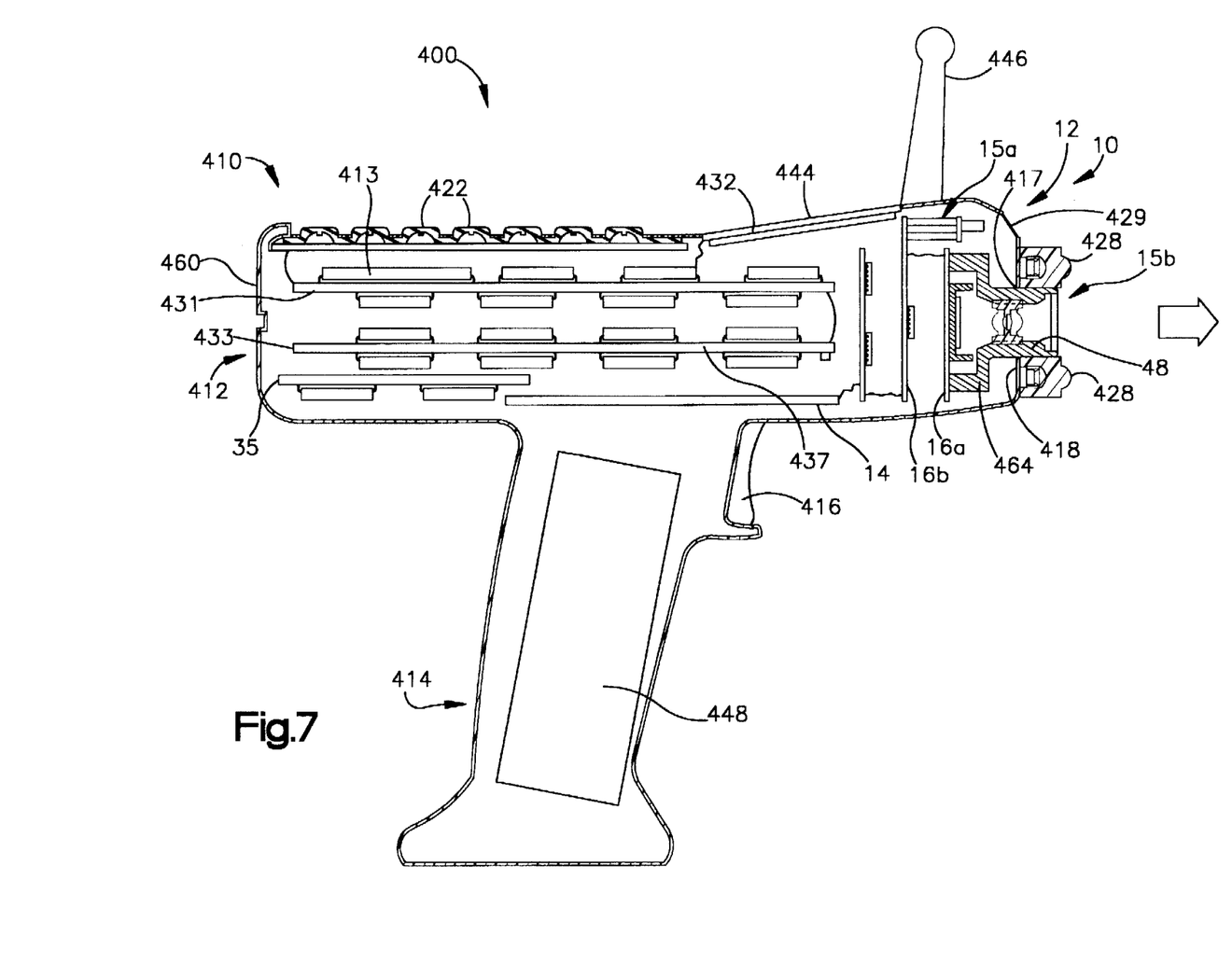
FIG. 7 shows a cut-away side view of the hand held portable dataform reader of FIG. 6.

FIGS. 6 and 7 illustrate a portable data collection system 400 in accordance with this invention. The system 400 may utilize either of the three reader module embodiments 10, 10', 10" previously discussed. The portable data collection system 400 comprises a housing 410 which is generally a gun shaped. The housing 410 includes an upper portion 412, forming an upper enclosure, and a handle portion 414 extending below the upper portion 412. The housing 410 is constructed of a suitable impact resistant plastic that provides both durability and is lightweight. A two-position trigger switch 416 is appropriately mounted and used to provide a signal to initiate a dataform reading session. A plurality of key switches 422 and a display screen 432 with an overlaying touch panel 444 are visible through an aperture in the upper portion 412 facing the operator.

As can best be seen in FIG. 7, the portable data collection system 400 includes a reader module 10 comprising an image capture assembly 12 including a laser bar code dataform reading assembly 15a and an imaging dataform reading assembly 15b. The reading assemblies 15a, 15b are supported on printed circuit boards 16b and 16a respectively. The image capture assembly 12 further includes a control and decoder board 14 which is electrically coupled to the reading assembly 15a, 15b. The imaging dataform reading assembly 15b is positioned inside of the housing 410 and a portion of the camera housing 48 extends through an aperture 417 in a front portion 418 of the housing 410 and an aligned aperture in an illumination module 428. The illumination module 428 comprises a set of illumination light emitting diodes (LEDs) and a pair of targeting or aiming LEDs. The illumination module 428 is energized in conjunction with operating the imaging dataform reading assembly 15b to provide sufficient illumination to permit the imaging dataform reading assembly to capture a decodable image in the reader module's target area. Details of a suitable illumination module are disclosed in application Ser. No. 08/484,435, filed Jun. 26, 1995, entitled "Extended Working Range Dataform Reader". Ser. No. 08/484,435 is assigned to the assignee of the present application and is incorporated herein in its entirety by reference. The laser bar code dataform reading assembly 15a is mounted on the board 16b. The laser beam exits through a transparent member or window 429 overlying a second aperture in the housing front portion 418. The window 429 may be moved at the Bragg angle to avoid internal reflection The illumination module 428 is mounted to the housing front portion 418. A seal (not shown) may be placed around a nose of the camera housing 48 to create a tight seal between the camera housing and the system housing 410 to prevent dirt and moisture from entering the interior of the system housing through the aperture 417.

In the preferred embodiment, the control and decoder board 14 is coupled to a main control board 431 which includes a microprocessor 413 for further processing the data transferred from the control and decoder board to the main control board via a data transfer link.

The main control board 431 includes a serial output port coupled to a connector (not shown) on the housing 410 operative to transfer the decoded data or image data to a remote terminal through a cable connection (not shown). The connector may be a traditional pin connector to which a mating connector is secured. Alternatively, the connector may comprise conductive contact surfaces 460 on the exterior of the housing 410 which align with mating contact surfaces when the device is placed in a docking station (not shown).

Because the data collection system 400 is intended for portable use, a wired connection to a host computer is impractical in many situations. Therefore, the portable data collection system 400 includes a spread spectrum micro radio mounted on a board 433 (FIGS. 11 and 13) providing a wireless link between the main control board 431 and a remote host computer (not shown). An external antenna 446 operates to improve radio communication reception. The spread spectrum radio board 433 includes digital and analog circuitry for transmitting and receiving data in a wireless network such as an IEEE 802.11 compatible direct sequence spread spectrum or frequency hopping spread spectrum network.

Power is supplied to the circuitry of the system 400 by a power cell 448. The spread spectrum radio and the dataform reader module both draw significant current from the power cell 448. Therefore, the radio should not operate during a dataform reading session and a dataform reading session should not start during communication to limit peak current draw. Therefore, the radio circuitry and the reader module provide blocking signals to each other to assure that both components doe not draw power simultaneously. The blocking signal from the radio to the reader module will prevent the initiation of a reading session. The session will be delayed until the signal desists. The blocking signal from the reader module to the radio will prevent the radio from sending or receiving data packets. Therefore, the network transmission protocol must be such that the radio in the portable dataform reader has complete control over when to transmit a packet and when it can receive a data packet. One such network protocol is the reverse poll protocol as described in U.S. Pat. No. 5,276,680 and assigned to Telesystems S/W Inc. U.S. Pat. No. 5,276,680 is hereby incorporated in its entirety by reference.

In the reverse poll protocol network, the portable device radio may transmit data packets to a network access point at any time, subject to the carrier frequency being free. However, the access point can only send a packet to the portable device within a time window following receipt of a packet from the portable device. To assure that the access point has enough opportunities to transmit data to the portable device, the portable device will periodically send packets even though the packets contain no significant data.

While the spread spectrum radio is effective for transmitting the decoded contents of a dataform, the radio's limited bandwidth makes it impractical for transmitting an entire uncompressed image. An image compression algorithm useful to reduce the size of a digital image file is the 2D wavelet transform as described in "A 64 kb/s Video Code Using the 2-D Wavelet Transform" by A. S. Lewis and G. Knowles, published in IEEE Computer Society Press, Order Number 2202. For example, the HARC wavelet transform system, available from Houston Advance Research Center in Houston, Texas, can be used to compress the photographic image before it is transmitted with an image compression ratio of up to 400:1.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

We claim:

1. A hand held dataform reader for reading a target dataform in a target area, the reader comprising:

a) a dataform reader module including:

i) a non-imaging dataform reading assembly energizable to read a target 1D bar code dataform including:
  1) a laser generating a laser beam;
  2) an oscillator for causing the beam to move in a reciprocating pattern along at least one axis so as to scan across a length of the target 1D bar code dataform; and
  3) a laser photosensor positioned to receive laser illumination reflected from the target dataform and generate a time varying voltage signal, a magnitude of the signal is proportional to a reflectivity of an area of the target 1D bar code dataform which the beam is incident upon;

ii) an imaging dataform reading assembly energizable to read a target 2D dataform including:
  1) a two dimensional photosensor array positioned to receive reflected illumination from a two dimensional target area including the target 2D dataform and reading out a plurality of photosensor elements of the two dimensional photosensor array after an exposure period to generate a time varying voltage signal representative of a two dimensional image of the target 2D dataform; and
  2) an optic assembly positioned intermediate the photosensor array and the target 2D dataform to focus reflected illumination from the two dimensional target area including the target 2D dataform onto the photosensor array;

b) decoding circuitry electrically coupled to the reader module for decoding the time varying voltage signal generated by the non-imaging dataform reading assembly to decode the target 1D bar code dataform and the time varying voltage signal generated by the imaging dataform reading assembly to decode the target 2D dataform; and c) selection and control circuitry electrically coupled to the reader module for energizing a selected one of the non-imaging dataform reading assembly and the imaging dataform reading assembly.

2. The hand held dataform reader of claim 1 wherein the selection and control circuitry first energizes a selected one of the non-imaging dataform reading assembly and the imaging dataform reading assembly and determines if the time varying voltage signal generated by the selected one of the non-imaging dataform reading assembly and the imaging dataform reading assembly is decodable and, if the time varying voltage signal is not decodable, deenergizes the selected one of the non-imaging dataform reading assembly and the imaging dataform reading assembly and energizes the other of the non-imaging dataform reading assembly and the imaging dataform reading assembly.

3. The hand held dataform reader of claim 1 wherein the imaging dataform reading assembly additionally includes an illumination module selectively energizable to illuminate the target 2D dataform during energization of the imaging dataform reading assembly.

4. The hand held dataform reader of claim 1, wherein, the selected and control circuitry first selects the non-imaging dataform reading assembly, energizes the assembly and analyzes the time varying voltage signal generated by the non-imaging dataform reading assembly to determine if the signal is decodable.

5. The hand held dataform reader of claim 1 wherein the selection and control circuitry includes exposure parameter control circuitry coupled to the imaging dataform reading assembly to adjust one or more operating parameters of the imaging dataform reading assembly during energization of the assembly such that the varying voltage signal generated by the imaging dataform reading assembly is decodable, the operating parameters including an exposure period and a gain setting of the imaging dataform reading assembly.

6. The hand held dataform reader of claim 1 wherein the photosensor array includes conversion circuitry to function as the laser photosensor of the non-imaging dataform reading assembly when the non-imaging dataform reading assembly is energized.

7. A hand held dataform reader for reading a target dataform, the reader comprising:

a) a non-imaging dataform capture system for reading a target 1D bar code dataform comprising:
  i) a laser diode generating a light beam along a path towards a target area including the target 1D dataform;
  ii) a scanner, including an oscillating platform to which the laser diode is secured for scanning the beam across the target area; and
  iii) a photosensor positioned to receive laser illumination reflected from the target 1D dataform in the target area, b) an imaging based dataform capture system for reading a target 2D dataform, the system comprising:
  i) a two dimensional photosensor array comprising a plurality of photosensors positioned to receive reflected illumination from a target area including the target 2D dataform and reading out the plurality of photosensor elements after an exposure period to generate a time varying signal representative of a two dimensional image of the target area including the target 2D dataform; and
  ii) an optic system positioned to the front of said sensor array for focusing an image of the target area onto said photosensor array, c) decoding circuitry electrically coupled to the reader module for decoding the time varying voltage signal generated by the non-imaging dataform capture system to decode the target 1D dataform and the time varying voltage signal generated by the imaging based dataform capture assembly to decode the target 2D dataform; and d) selection and control circuitry electrically coupled to the non-imaging dataform capture system and the imaging based dataform capture system for energizing a selected one of the non-imaging dataform capture system and the imaging based dataform capture system based on characteristics of the target dataform.

8. The hand held dataform reader of claim 7, wherein, said selection and control circuitry includes circuitry for detecting the presence of a dataform in a target area and determining whether the detected dataform is a 1D dataform or a 2D dataform.

9. The hand held dataform reader of claim 8, wherein, the selection and control circuitry energizes the non-imaging dataform capture system when the detected dataform is determined to be a 1D dataform.

10. The hand held dataform reader of claim 7, wherein, the selection and control circuitry energizes the imaging based dataform capture system when the detected dataform is determined to be a 2D dataform.

11. The hand held dataform reader of claim 7 wherein the 1D dataform is a 1D bar code dataform.

12. The hand held dataform reader of claim 1 wherein the 2D dataform is a 2D bar code dataform.

13. The hand held dataform reader of claim 7 wherein the 2D dataform is a 2D bar code dataform.

* * * * *